United States Patent Office 2,995,413
Patented Aug. 8, 1961

2,995,413
PROCESS AND COMPOSITION FOR COLORING FIBROUS MATERIALS
Arthur F. Klein, Philadelphia, Pa., and Albert Voorhees, Somerville, N.J., assignors to American Cyanamid Company, New York, N.Y., a corporation of Maine
No Drawing. Filed July 30, 1956, Ser. No. 600,670
10 Claims. (Cl. 8—70)

This invention relates to vat dye compositions and to methods of preparing them. More particularly, it relates to vat dye compositions which are usable with printing thickeners, either for standard printing operations or the so-called "flash aging" process. It includes printing compositions containing the new vat dyeing compositions.

In ordinary vat printing processes the vat dyestuff type is usually prepared by treating a vat dye presscake with a wetting agent, such as the sodium salt of disulfodinaphthyl methane to release the bound water and then adding such other materials as printing assistants, humectants, organic solvents to prevent freezing, antifermenting material and the like. The material may be sold in either paste or powder form. In either case the paste or powder is admixed with a suitable thickener, which is usually a dispersion of carbohydrate gum, to form a printing color paste suitable for application. To this paste there is also ordinarily added a reducing agent, such as sodium formaldehydesulfoxylate and alkali. In the "flash aging" process the dye is mixed with a neutral gum or one containing only an insignificant amount of alkali. The composition is then printed on to the fabric and dried, the fabric is passed through a solution of alkali and reducing agent, then to a steam chest where color reduction takes place and then the dyestuff is reoxidized to the pigment form.

The use of printing assistants, of various types of solvent, etc., has achieved great popularity because of the improved prints which results. One of the important assistants is thiodiethylene glycol. Thiodiethylene glycol may be added when the printing paste is made up or it may be incorporated with the vat dye paste or powder which is sold to the printer. In each case the addition is at room temperature or at least under conditions where there is no reaction with the vat dyestuff itself.

According to the present invention, we have found that if, instead of adding thiodiethylene glycol under substantially non-reacting conditions to the vat dyestuff, either the thiodiethylene glycol or a number of other agents which, though chemically unrelated, behave in the same manner; namely, urea, diethylene glycol, glycerine and sorbitol, are heated with the dyestuff until reaction takes place, a marked increase in strength and brightness results. It is not known exactly what the reaction is, although it is known that it must take place in the presence of a reducing agent. There is, however, a definite reaction to form some definite compound, for example in the case of 6,6'-dichloro-4,4'-dimethyl-bis-thionaphthene indigo, the pink dyestuff is transformed into needle-like crystals of a greenish-gray color which do not resemble the sodium salt of the leuco dyestuff nor the leuco dyestuff itself in the form of its free acid, the so-called vat acid. Just what its composition is, is not known nor is it known what is the mechanism which is involved. All that is known is that a reaction of materials specified above takes place with the vat dyestuff under reducing conditions.

The compositions of the present invention, or printing pastes containing them, give stronger and brighter prints either by the conventional printing method or by the "flash aging" method. The degree of improvement in brightness or strength, usually both, over prints with exactly the same composition but which have not been subjected to heating so that reaction takes place between the vat dyestuff and the thiodiethylene glycol or other materials used in the present invention, varies with different vat dyestuffs and also to some extent with the particular reactants used. In general, the best results are obtained with thiodiethylene glycol although this is not true in every case. Also the degree of improvement varies, depending on whether conventional printing or flash aging is used. Further variations take place, depending on the nature of the cellulosic fabric printed. In some cases improvements are greater in the printing of cotton than in the printing of rayon and in other cases the reverse is true.

It is an advantage that the amounts of the reactant used are not critical. It should be realized that the materials are not acting as catalysts, and, therefore, should be present in amounts comparable to that of the vat dye paste used. Equal parts by weight have been found to be very satisfactory but the relative amounts can be varied over a considerable range. Obviously, of course, great excesses of the reactants are undesirable economically because they add to the cost without corresponding improvement in strength. However, the limits are purely practical and are in no sense critical. Therefore, an extremely precise control of the preparation of the dyestuff compositions or their use becomes unnecessary which is a great operating advantage.

Tht invention will be described in conjunction with the examples in which the parts are by weight and which illustrate typical printing compositions and procedures, both by the conventional and flash aging methods. It should be understood that the advantages of the present invention are not limited to these particular printing formulations and other printing thickeners may be used with substantially the same results.

*Example 1*

A conventional printing gum formula was prepared as follows: 1816 parts of wheat starch were slurried with 3600 parts of cold water in a kettle until smooth. Then 1604 parts of British gum were stirred in until a thick, smooth paste was obtained. Thereupon the same amount of British gum and 2400 parts of cold water were added in alternate portions with stirring which is continued until the paste was smooth. The temperature was raised to 200° F. and held there for 30 minutes, then cooled to 150° F., and a solution of 3008 parts of potassium carbonate and 2000 parts of cold water were added. Next there were added 2140 parts of sodium formaldehydesulfoxylate, and 2140 parts of water, stirring being continued with the addition of sufficient water to compensate for evaporation loss amounting to about 590 parts. After a smooth mixture was obtained the mixture was cooled to room temperature, further stirred, and strained through a cheese cloth.

*Example 2*

To 3500 parts of water was slowly added 160 parts of cold, water-soluble modified locust bean gum with stirring. After all of the gum was added and thoroughly mixed, sufficient water was added to bring up the volume to 4000 parts.

*Example 3*

Ten parts of a pink vat dye paste containing 1.6 parts of 6,6'-dichloro-4',4-dimethyl-bis-thionaphthene indigo, 10 parts of sodium formaldehydesulfoxylate, 30 parts of water, and 10 parts of thiodiethylene glycol were heated until reduction was complete as is shown by the formation of gray-green needles. Heating was stopped and sufficient cold water was added to make up for the evaporation. The mixture was then cooled to room temperature and divided into two portions, in the one case there being added 70 parts of a gum of Example 1, and in the other, 70 parts of the gum of Example 2. Similar mixtures were prepared with the same weight of chemicals but without heating the dyestuff, sulfoxylate and solvent.

These four printing pastes were used to print on 80 x 80 cotton and on spun rayon. The prints where the gum of Example 1 was used were dried and aged for 5 minutes at 214° F. The prints with the gum of Example 2 were dried and the dried fabrics were passed through a "flash aging" reduction bath, containing 110 parts of sodium carbonate, 110 parts of Glauber's salt, 20 parts of sodium hydroxide, 20 parts of sodium hydrosulfite, and 620 parts of water. The fabrics were then passed into an ager, and flash aged 25 seconds at 230° F. The prints were then oxidized, rinsed and soaped, rinsed again and dried.

The following table shows the printing results. In each case the column headed "Cooked" designates the compositions in which the dyestuff was heated with the thiodiethylene glycol. Strength in comparisons in this table, and in the following examples, are based on the strength of the print where the dyestuff had not been cooked as a standard.

CONVENTIONAL AGING METHOD

|  | Cotton | | Spun Rayon | |
|---|---|---|---|---|
|  | Not Cooked | Cooked | Not Cooked | Cooked |
| Shade | Standard | Sl. Yellower. Sl. Brighter. | Standard | Sl. Yellower. Sl. Brighter. |
| Strength | 100% | 200% | 100% | 200%. |

FLASH AGING METHOD

|  | Cotton | | Spun Rayon | |
|---|---|---|---|---|
|  | Not Cooked | Cooked | Not Cooked | Cooked |
| Shade | Standard | Sl. Yellower. Sl. Brighter. | Standard | Sl. Yellower. Sl. Brighter. |
| Strength | 100% | 165% | 100% | 200%. |

*Example 4*

The procedure of Example 3 was followed, replacing the thiodiethylene glycol with the same amounts, respectively, of urea, diethylene glycol, glycerine and sorbitol. The following table shows the results.

|  | Conventional Aging Method | | | |
|---|---|---|---|---|
|  | Cotton | | Spun Rayon | |
|  | Not Cooked | Cooked | Not Cooked | Cooked |
| Leuco formula with Urea: | | | | |
| Shade | Standard | Sl. Yellower. Sl. Brighter. | Standard | Sl. Yellower. Sl. Brighter. |
| Strength | 100% | 200% | 100% | 200%. |
| Leuco formula with Diethylene Glycol: | | | | |
| Shade | Standard | Sl. Yellower. Sl. Brighter. | Standard | Sl. Yellower. Sl. Brighter. |
| Strength | 100% | 165% | 100% | 200%. |
| Leuco formula with Glycerine: | | | | |
| Shade | Standard | Sl. Yellower. Sl. Brighter. | Standard | Sl. Yellower. Sl. Brighter. |
| Strength | 100% | 165% | 100% | 165%. |
| Leuco formula with Sorbitol: | | | | |
| Shade | Standard | Sl. Yellower. Sl. Brighter. | Standard | Sl. Yellower. Sl. Brighter. |
| Strength | 100% | 115% | 100% | 165%. |

|  | Flash Aging Method | | | |
|---|---|---|---|---|
|  | Cotton | | Spun Rayon | |
|  | Not Cooked | Cooked | Not Cooked | Cooked |
| Leuco formula with Urea: | | | | |
| Shade | Standard | Sl. Yellower. Sl. Brighter. | Standard | Sl. Yellower. Sl. Brighter. |
| Strength | 100% | 200% | 100% | 200%. |
| Leuco formula with Diethylene Glycol: | | | | |
| Shade | Standard | Sl. Yellower. Sl. Brighter. | Standard | Sl. Yellower. Sl. Brighter. |
| Strength | 100% | 90% | 100% | 200%. |
| Leuco formula with Glycerine: | | | | |
| Shade | Standard | Sl. Yellower. Sl. Brighter. | Standard | Sl. Yellower. Sl. Brighter. |
| Strength | 100% | 200% | 100% | 250%. |
| Leuco formula with Sorbitol: | | | | |
| Shade | Standard | Sl. Yellower. Sl. Brighter. | Standard | Sl. Yellower. Sl. Brighter. |
| Strength | 100% | 200% | 100% | 250%. |

Example 5

The procedures of Examples 3 and 4 were repeated, replacing half of the vat dye with an equal amount of orange dyestuff C.I. 1217 to produce a scarlet dyeing. The results are shown in the following table.

|  | Conventional Aging Method | | | |
|---|---|---|---|---|
|  | Cotton | | Spun Rayon | |
|  | Not Cooked | Cooked | Not Cooked | Cooked |
| Leuco formula with Thiodiethylene Glycol: | | | | |
| Shade | Standard | Sl. Yellower / Sl. Brighter | Standard | Sl. Yellower. / Sl. Brighter. |
| Strength | 100% | 150% | 100% | 150%. |
| Leuco formula with Urea: | | | | |
| Shade | Standard | Sl. Yellower / Sl. Brighter | Standard | Sl. Yellower. / Sl. Brighter. |
| Strength | 100% | 150% | 100% | 130%. |
| Leuco formula with Diethylene Glycol: | | | | |
| Shade | Standard | Sl. Brighter | Standard | Sl. Brighter. |
| Strength | 100% | 120% | 100% | 120%. |
| Leuco formula with Glycerine: | | | | |
| Shade | Standard | Sl. Yellower / Sl. Brighter | Standard | Sl. Yellower. / Sl. Brighter. |
| Strength | 100% | 120% | 100% | 120%. |
| Leuco formula with Sorbitol: | | | | |
| Shade | Standard | Sl. Yellower / Sl. Brighter | Standard | Sl. Yellower. / Sl. Brighter. |
| Strength | 100% | 105% | 100% | 115%. |

|  | Flash Aging Method | | | |
|---|---|---|---|---|
|  | Cotton | | Spun Rayon | |
|  | Not Cooked | Cooked | Not Cooked | Cooked |
| Leuco formula with Thiodiethylene Glycol: | | | | |
| Shade | Standard | Sl. Yellower / Sl. Brighter | Standard | Sl. Yellower. / Sl. Brighter. |
| Strength | 100% | 130% | 100% | 200%. |
| Leuco formula with Urea: | | | | |
| Shade | Standard | Sl. Yellower / Sl. Brighter | Standard | Sl. Yellower. / Sl. Brighter. |
| Strength | 100% | 140% | 100% | 165%. |
| Leuco formula with Diethylene Glycol: | | | | |
| Shade | Standard | Sl. Yellower / Sl. Brighter | Standard | Sl. Yellower. / Sl. Brighter. |
| Strength | 100% | 130% | 100% | 165%. |
| Leuco formula with Glycerine: | | | | |
| Shade | Standard | Sl. Yellower / Sl. Brighter | Standard | Sl. Yellower. / Sl. Brighter. |
| Strength | 100% | 130% | 100% | 120%. |
| Leuco formula with Sorbitol: | | | | |
| Shade | Standard | Sl. Yellower / Sl. Brighter | Standard | Sl. Yellower. / Sl. Brighter. |
| Strength | 100% | 140% | 100% | 120%. |

Example 6

The procedures of Examples 3 and 4 are repeated, replacing the dyestuff with the dyestuff of C.I. 1099. The following table shows the results.

|  | Conventional Aging Method | | | |
|---|---|---|---|---|
|  | Cotton | | Spun Rayon | |
|  | Not Cooked | Cooked | Not Cooked | Cooked |
| Leuco formula with Thiodiethylene Glycol: | | | | |
| Shade | Standard | Similar | Standard | Similar. |
| Strength | 100% | 100% | 100% | 150%. |
| Leuco formula with Urea: | | | | |
| Shade | Standard | Sl. Redder | Standard | Similar. |
| Strength | 100% | 150% | 100% | 115%. |
| Leuco formula with Diethylene Glycol: | | | | |
| Shade | Standard | Similar | Standard | Sl. Greener. |
| Strength | 100% | 150% | 100% | 120%. |
| Leuco formula with Glycerine: | | | | |
| Shade | Standard | Similar | Standard | Similar. |
| Strength | 100% | 150% | 100% | 165%. |
| Leuco formula with Sorbitol: | | | | |
| Shade | Standard | V. Sl. Redder | Standard | Similar. |
| Strength | 100% | 105% | 100% | 110%. |

| | Flash Aging Method | | | |
|---|---|---|---|---|
| | Cotton | | Spun Rayon | |
| | Not Cooked | Cooked | Not Cooked | Cooked |
| Leuco formula with Thiodiethylene Glycol: | | | | |
| Shade | Standard | Sl. Redder / Brighter | Standard | V. Sl. Greener. / Sl. Brighter. |
| Strength | 100% | 120% | 100% | 100%. |
| Leuco formula with Urea: | | | | |
| Shade | Standard | Sl. Redder / Brighter | Standard | Similar. |
| Strength | 100% | 130% | 100% | 200%. |
| Leuco formula with Diethylene Glycol: | | | | |
| Shade | Standard | Redder / Brighter | Standard | Sl. Brighter. |
| Strength | 100% | 120% | 100% | 120%. |
| Leuco formula with Glycerine: | | | | |
| Shade | Standard | Redder / Brighter | Standard | Sl. Brighter. |
| Strength | 100% | 165% | 100% | 150%. |
| Leuco formula with Sorbitol: | | | | |
| Shade | Standard | Sl. Redder | Standard | Similar. |
| Strength | 100% | 100% | 100% | 120%. |

We claim:

1. A neutral, vat dye, printing gum composition adapted for use in the flash-aging method of printing, said composition comprising the gum and the reaction product obtained by heating a mixture consisting essentially of the vat dye, water, sodium formaldehyde sulfoxalate and thiodiethylene glycol.

2. A neutral, vat dye, printing gum composition adapted for use in the flash-aging method of printing, said composition comprising the gum and the reaction product obtained by heating a mixture consisting essentially of the vat dye, water, sodium formaldehyde sulfoxalate and urea.

3. A neutral, vat dye, printing gum composition adapted for use in the flash-aging method of printing, said composition comprising the gum and the reaction product obtained by heating a mixture consisting essentially of the vat dye, water, sodium formaldehyde sulfoxalate and diethylene glycol.

4. A neutral, vat dye, printing gum composition adapted for use in the flash-aging method of printing, said composition comprising the gum and the reaction product obtained by heating a mixture consisting essentially of the vat dye, water, sodium formaldehyde sulfoxalate and glycerine.

5. A neutral, vat dye, printing gum composition adapted for use in the flash-aging method of printing, said composition comprising the gum and the reaction product obtained by heating a mixture consisting essentially of the vat dye, water, sodium formaldehyde sulfoxalate and sorbitol.

6. A modified vat dye composition obtained by heating a mixture consisting essentially of the vat dye, sodium formaldehyde sulfoxalate, water and thiodiethylene glycol.

7. A modified vat dye composition obtained by heating a mixture consisting essentially of the vat dye, sodium formaldehyde sulfoxalate, water and urea.

8. A modified vat dye composition obtained by heating a mixture consisting essentially of the vat dye, sodium formaldehyde sulfoxalate, water and diethylene glycol.

9. A modified vat dye composition obtained by heating a mixture consisting essentially of the vat dye, sodium formaldehyde sulfoxalate, water and glycerine.

10. A modified vat dye composition obtained by heating a mixture consisting essentially of the vat dye, sodium formaldehyde sulfoxalate, water and sorbitol.

References Cited in the file of this patent

UNITED STATES PATENTS

| 1,963,967 | Berthold | June 26, 1934 |
| 2,029,999 | Grieshaber | Feb. 4, 1936 |
| 2,063,147 | Berthold | Dec. 8, 1936 |
| 2,266,890 | Miller | Dec. 23, 1941 |
| 2,874,022 | Raff | Feb. 17, 1959 |

OTHER REFERENCES

"The Application of Vat Dyes," A.A.T.C.C. Monograph No. 2 (1953), page 194.